US006538882B2

(12) United States Patent
Branch et al.

(10) Patent No.: US 6,538,882 B2
(45) Date of Patent: Mar. 25, 2003

(54) MODULE HAVING A LATCH

(75) Inventors: Scott Michael Branch, Rochester, MN (US); Michael Francis Hanley, Rochester, MN (US)

(73) Assignee: JDS Uniphase Corporation, San Jose, CA (US)

( * ) Notice: Subject to any disclaimer, the term of this patent is extended or adjusted under 35 U.S.C. 154(b) by 89 days.

(21) Appl. No.: 09/852,003

(22) Filed: May 10, 2001

(65) Prior Publication Data

US 2002/0167793 A1 Nov. 14, 2002

(51) Int. Cl.[7] .................................................. G06F 1/16
(52) U.S. Cl. ........................................ 361/687; 439/180
(58) Field of Search ................................ 439/296, 372, 439/638, 76.1, 157, 352, 180; 361/687, 754, 728, 798, 801, 752, 759; 211/41.17

(56) References Cited

U.S. PATENT DOCUMENTS

| | | | | |
|---|---|---|---|---|
| 5,575,678 A | * | 11/1996 | Okumura et al. | 439/372 |
| 5,901,263 A | * | 5/1999 | Gaio et al. | 385/88 |
| 6,074,228 A | * | 6/2000 | Berg et al. | 385/75 |
| 6,135,793 A | * | 10/2000 | Babineau | 361/753 |
| 6,142,802 A | * | 11/2000 | Berg et al. | 385/75 |
| 6,439,918 B1 | * | 8/2002 | Togami et al. | 439/372 |

OTHER PUBLICATIONS

U.S. Ser. No. 09/410,786, entitled: Removable Latch and Bezel EMI Grounding Feature for Fiber–Optic Transceivers.
U.S. Ser. No. 09/489,184, entitled: Removable Small Form Factor Fiber Optic Transceiver Module and Electromagnetic Radiation Shield).

U.S. Ser. No. 09/489,870, entitled: Removable Small Form Factor Fiber Optic Transceiver Module Chassis.

U.S. Ser. No. 09/591,640, entitled: Pivoting Type Latch for Removable Electronic Devices.

U.S. Ser. No. 09/657,214, entitled: Pull Type Latch Mechanism for Removable Small Form Factor Electronic Modules.

U.S. Ser. No. 09/703,644, entitled: Enhanced Module Kick–Out Spring Mechanism for Removal Small Form Factor Optical Transceivers.

U.S. Ser. No. 09/669,624, entitled: Pull Type Latch Mechanism for Removable Small Form Factor Electronic Modules.

U.S. Ser. No. 09/801,320, entitled: Pull–To–Release Type Latch Mechanism for Removable Small Form Factor Electronic Modules.

* cited by examiner

*Primary Examiner*—Darren Schuberg
*Assistant Examiner*—Anthony Q. Edwards
(74) *Attorney, Agent, or Firm*—Allen, Dyer, Doppelt, Milbrath & Gilchrist, P.A.

(57) ABSTRACT

A module includes a module body adapted to plug into a mating port, and a latch member attached to the module body. The latch member is immovable relative to the module body when attached to the module body. The latch member is essentially always engaged with a receiving member of the mating port when the module body is plugged into the mating port, which always hinders a removal of the module body from the mating port.

25 Claims, 9 Drawing Sheets

FIG. 6
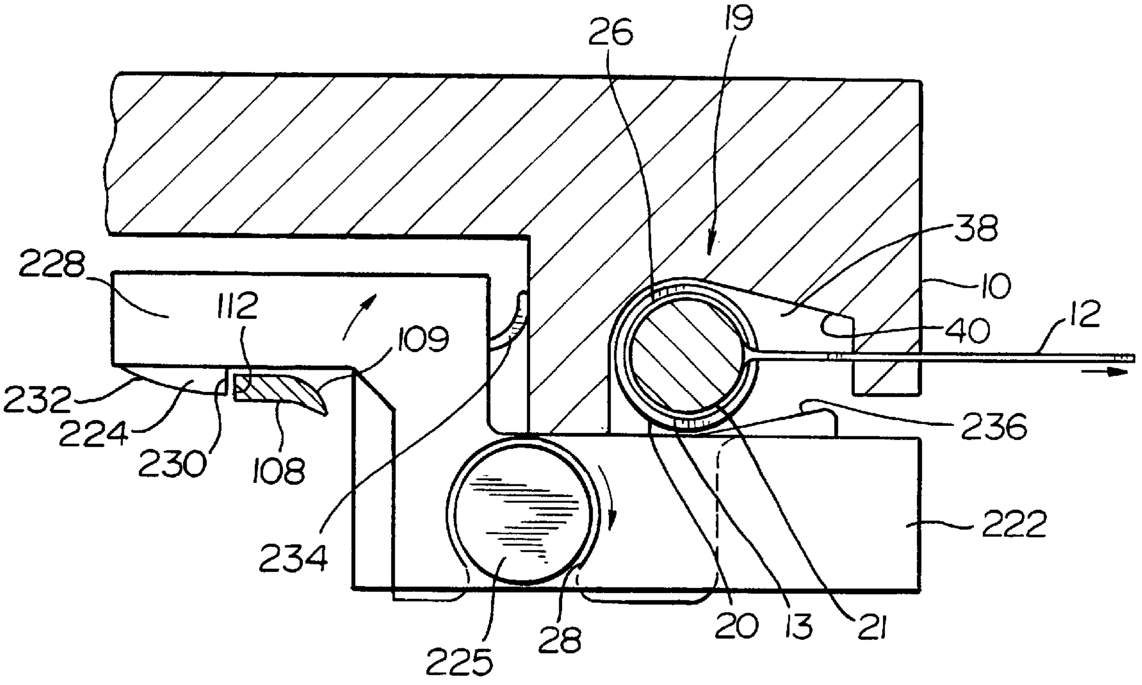
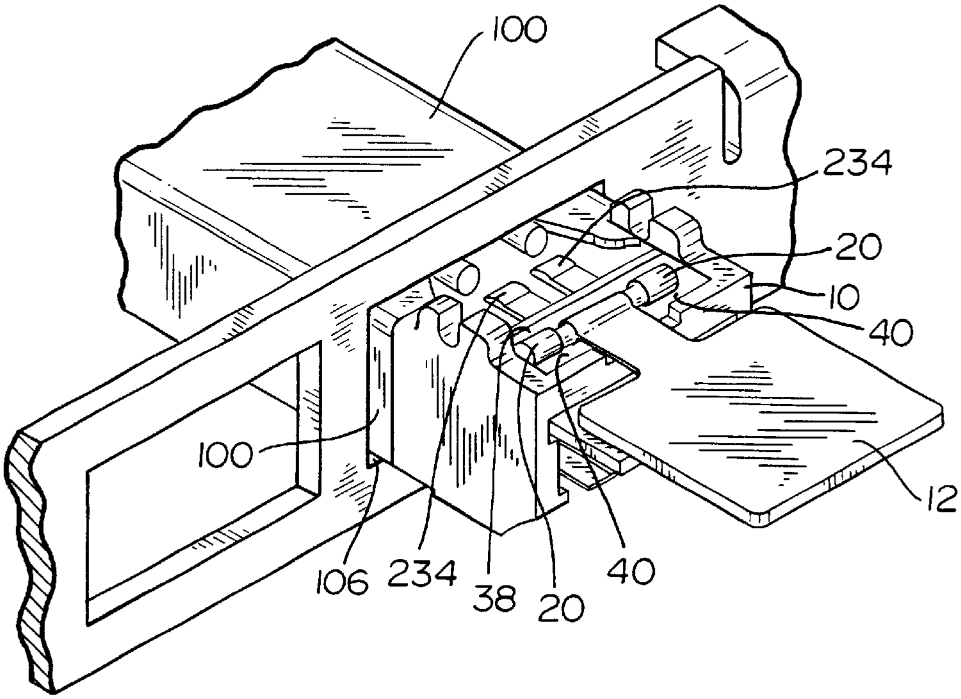
FIG. 7

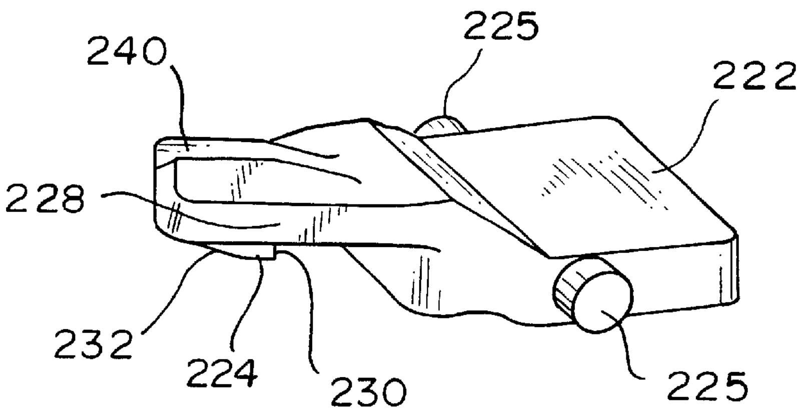
FIG. 9
FIG. 10
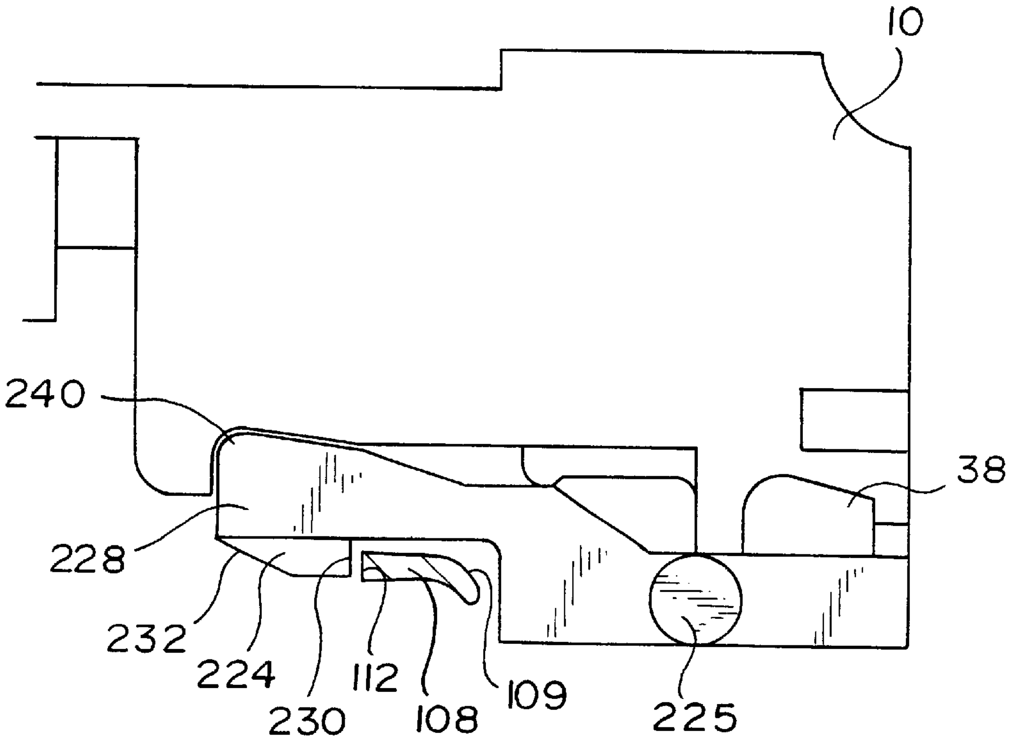

MODULE HAVING A LATCH

CROSS-REFERENCE TO RELATED APPLICATIONS

The following are related co-pending United States patent applications:

REMOVABLE SMALL FORM FACTOR FIBER OPTIC TRANSCEIVER MODULE CHASSIS, Ser. No. 09/489,870, filed Jan. 20, 2000, by Scott M. Branch, David P. Gaio and William K. Hogan;

REMOVABLE LATCH AND BEZEL EMI GROUNDING FEATURE FOR FIBER-OPTIC TRANSCEIVERS, Ser. No. 09/410,786, filed Oct. 1, 1999, by Scott M. Branch, David P. Gaio and William K. Hogan;

REMOVABLE SMALL FORM FACTOR FIBER OPTIC TRANSCEIVER MODULE AND ELECTROMAGNETIC RADIATION SHIELD, Ser. No. 09/489,184, filed Jan. 20, 2000, by Scott M. Branch, David P. Gaio and William K. Hogan;

PIVOTING TYPE LATCH FOR REMOVABLE ELECTRONIC DEVICES, Ser. No. 09/591,640 filed Jun. 9, 2000, by Scott M. Branch, Leland L. Day, David P. Gaio, Michael F. Hanley and William K. Hogan.;

PULL TYPE LATCH FOR REMOVABLE SMALL FORM FACTOR ELECTRONIC MODULES, Ser. No. 09/657,214, filed Sep. 7, 2000 by Scott M. Branch, David P. Gaio, Michael F. Hanley and William K. Hogan,; and PULL TYPE LATCH MECHANISM FOR REMOVABLE SMALL FORM FACTOR ELECTRONIC MODULES, Ser. No. 09/669,624, filed Sep. 25, 2000 by Scott M. Branch, William K. Hogan, Michael F. Hanley and David P. Gaio, which are incorporated herein in their entireties for purposes of disclosure by this reference.

BACKGROUND OF THE INVENTION

1. Field of the Invention

The invention relates to a module having a latch, and more specifically, to a plug-once type latch, and to a module with interchangeable latch members.

2. Background Information

Increasingly, computers are being interconnected with other computers to form communication and data networks. Large amounts of data and other communications are transmitted and received over such networks. The networks are desirably provided with reliable connections of coaxial or fiber-optic cables, or other conduits to computers or network interface devices, in order to provide continuous and uninterrupted connections. Networked computers may often operate continuously, twenty-four hours a day, to provide the services or data that a computer is expected to provide upon demand to remote computers.

Easy and reliable conduit connections are desirable to permit rapid, easy and reliable connections of conduits. One approach, which is rapidly becoming a standard within the industry, utilizes a transceiver module to receive signals from a network cable and to transmit signals to the computer, and vice-versa. The transceiver modules are inserted into and connected to mating ports of a computer or interface device. Transceiver modules may be fashioned in various versions, as long as compatible with the particular mating port and connector in a particular computer or interface device.

The transceiver modules should be reliably latched into mating ports and reliably retained against reasonable forces exerted on cables to prevent unintended disconnection from the mating ports. At the same time, the latching of the transceiver modules should not be so resistive to unintentional disconnection forces that the transceiver module is damaged if a conduit is pulled excessively.

Computers may be used in environments in which it is desirable to latch and unlatch transceiver modules with mating ports frequently, as with portable computers that are transported to different physical locations, for example. Therefore, it would be desirable for certain transceiver modules to have latching mechanisms that are easily unlatched.

As disclosed in the above-noted application entitled "PULL TYPE LATCH MECHANISM FOR REMOVABLE SMALL FORM FACTOR ELECTRONIC MODULES", a module may include a pull-to-release latch that extends outwardly from the end of a module. By pulling on the pull tab, the latching mechanism may be unlatched quickly and easily.

However, networked computers may be physically arranged such that transceiver modules, and removal elements protruding from transceiver modules or mating ports (such as the aforementioned pull-to-release latch), are exposed to passers-by. For example, in a computer laboratory, computers may be aligned in rows with walkways between the rows. Transceiver modules and removal elements that are visible to passers-by are susceptible to unauthorized or improper interaction therewith by the passers-by due to curiosity or mischief. Where the passers-by are young in age, as in a grade school setting, the risk of improper interaction due to curiosity or mischief may be significant. Therefore, it would be desirable for certain latching mechanisms of transceivers to be plug-once; that is, they are not too easily unlatchable or releasable.

Further, since the environments of computers may change, a significant risk of improper interaction may change to an insignificant one, and vice-versa. Also, an environmental change may also change frequent latching and unlatching from undesirable to desirable, and vice-versa. Therefore, it would be desirable to provide end-users with the ability to change a plug-once latch to a pull-to-release or otherwise releasable latch, and vice-versa. Thus, it would be desirable to provide a latching mechanism kit for a module, which includes a plug-once latch and a readily releasable latch, so an end-user may interchange latches as desired.

SUMMARY OF THE INVENTION

It is, therefore, a principal object of this invention to provide a module having a latch.

It is another object of the invention to provide a module having a latch that solves the above-mentioned problems.

It is another object of the invention to provide a latching mechanism kit for a module, which includes a plug-once latch and a readily releasable latch.

These and other objects of the present invention are accomplished by the disclosure herein.

In an exemplary aspect of the invention, a mating port is attached to a circuit board, and projects through a housing port in an electronic system housing or bezel. The mating port includes a receiving member with an opening, which is provided with an edge. The opening and edge form an engaging surface that engages and retains a latch member.

In a further exemplary aspect of the invention, pull-to-release and plug-once latch members have a lug disposed on a lower surface, and shafts on either side for engagement with frames on a lower portion of a module. The lug has a sloped portion, and an engagement portion that engages with the engaging surface of the receiving member.

In another exemplary aspect of the invention, a pull-to-release latch member is pivotably engaged with a module and has at least one ramp on an upper surface. A pull tab latch control actuator, resides in a chamber of a module and has a pull tab attached thereto, which extends from the module. Pulling the pull tab moves the actuator between a raised portion of the ramp and part of the module body, which pushes the raised portion away from the part of the module body and causes the latch member to pivot such that the lug is raised out of engagement with the receiving member. The restore action to reposition a pull-to-release latch member may be accomplished by the latch member being made of a resilient material, or a biasing member disposed on the latch member or module body.

In a further exemplary aspect of the invention, a plug-once latch member has an upper surface that abuts a lower portion of the module body when the latch member is in engagement with the module. This abutment prevents the lug of a plug-once latch member from being raised out of engagement with the receiving member.

In yet another exemplary aspect of the invention, a module kit includes a module with at least one pull-to-release latch members and at least one plug-once latch member. The shafts are removably engageable with the frames of the module body, such that the latch members may be advantageously interchanged as desired.

BRIEF DESCRIPTION OF THE DRAWINGS

FIG. 6 is a partial side section view of a transceiver module, the latch actuator pull tab and a pull-to-release latch member engaged with the receiving member.

FIG. 7 is a bottom view of a transceiver module, with a pull-to-release latch member removed and the latch actuator pull tab extending from the transceiver module.

FIG. 9 is an upper isometric view of a plug-once latch member.

FIG. 10 is a partial side section view of a transceiver module and a plug-once latch member engaged therewith.

DETAILED DESCRIPTION OF THE PREFERRED EMBODIMENTS

Aspects of the invention will now be described in more detail by way of example with reference to the embodiments shown in the accompanying figures. It should be kept in mind that the following described embodiments are only presented by way of example and should not be construed as limiting the inventive concept to any particular physical configuration.

Further, if used and unless otherwise stated, the terms "upper," "lower," "front," "back," "over," "under," and similar such terms are not to be construed as limiting the invention to a particular orientation. Instead, these terms are used only on a relative basis.

The present invention is directed towards a transceiver module having a plug-once latch, and a latching mechanism kit for a module, which includes a plug-once latch and a readily releasable latch.

The transceiver module according to the present invention is adapted to accommodate a transceiver subassembly therein, which receives electronic signals from a computer and converts those electronic signals to light pulse signals corresponding to the electronic signals for transmission over a network via a conduit. The transceiver subassembly similarly will receive light pulse signals from a conduit and convert the light signals to electronic signals for transmission to the computer. The transceiver subassemblies may be connected to a conduit connector, such as a fiber optic cable connector, for example, which is insertable into a transceiver module resident in a communications port of a computer system. Similarly, a transceiver module capable of accepting and transmitting electronic signals over coaxial cable also may be inserted into the communications port of a computer whenever coaxial cable is used in the network.

Figure 1:
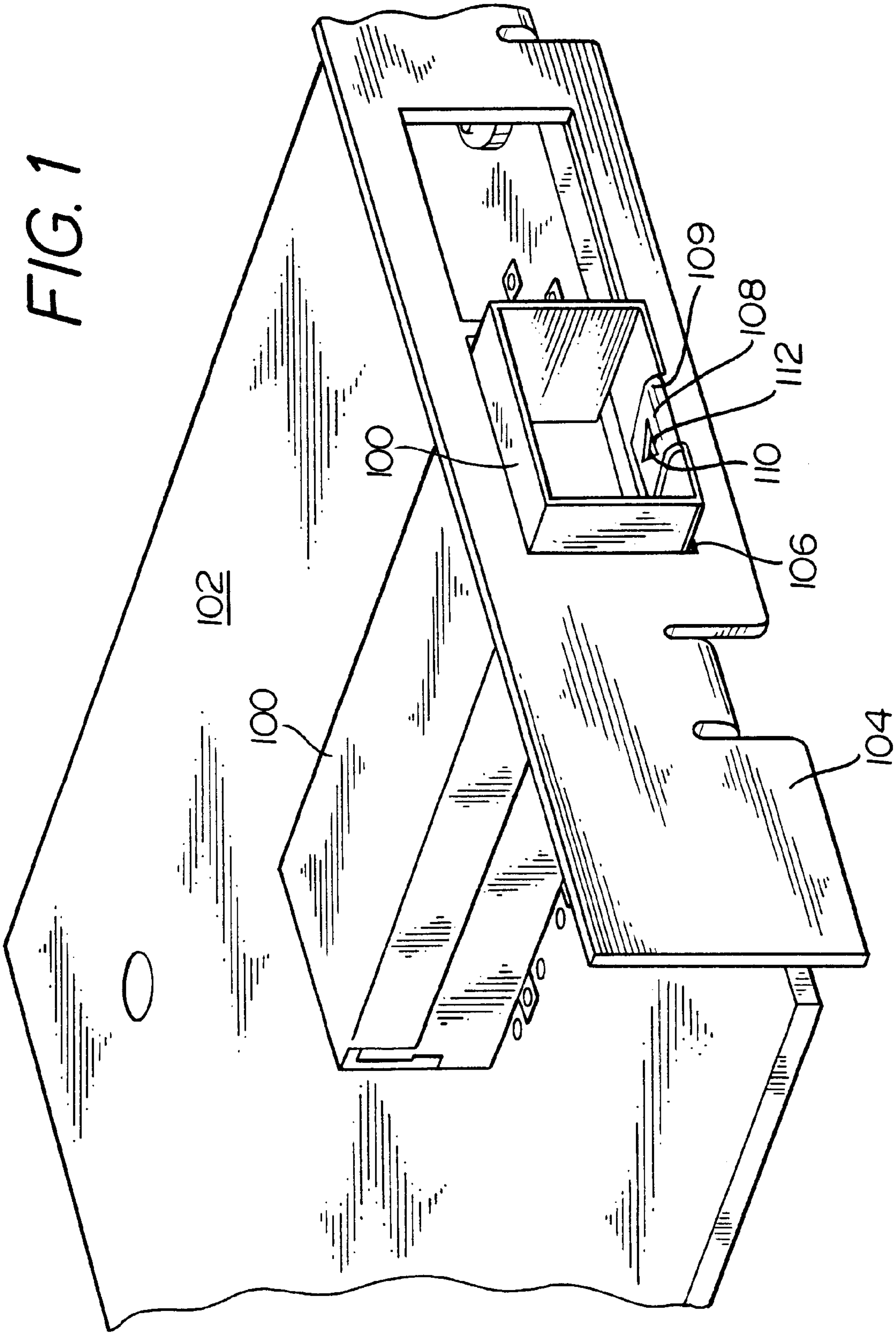
FIG. 1 is an isometric view of an electronic circuit board, cage and system housing bezel with the cage projecting through the bezel and providing a receiving member for a latch member.

Initial reference is made to FIG. 1, which shows mating port 100, of a cage for example, attached to a circuit board 102, and being adapted to receive a transceiver module (not shown). The mating port 100 projects through a housing port 106 in an electronic system housing (i.e., bezel) 104. The mating port 100 includes a receiving member 108, for example a cantilevered beam spring, provided with an opening 110 therein. A slanted portion 109 at the end of the receiving member 108 projects through the system housing 104. Opening 110 is provided with an edge. Opening 110 and specifically, the edge of receiving member 108 form an engaging surface 112 that engages and retains a latch member 222, shown in FIG. 2.

Figure 2:
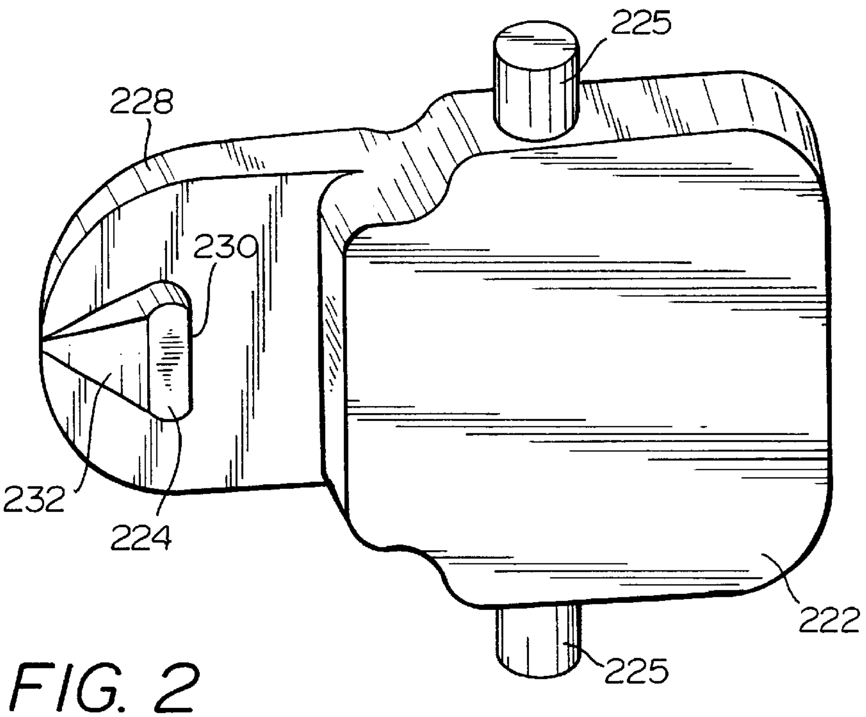
FIG. 2 is a bottom isometric view of a latch member that engages with the receiving member illustrated in FIG. 1.

FIG. 2 illustrates a bottom view of the latch member 222, of an exemplary transceiver module. The latch member 222 has shafts 225 on either side thereof, and a latch arm 228. A lug 224 is disposed on the latch arm 228 and on a lower surface of the latch member. Lug 224 has a sloped portion 232, and an engagement portion 230 that engages with the engaging surface 112 of the receiving member 108.

Figure 3:
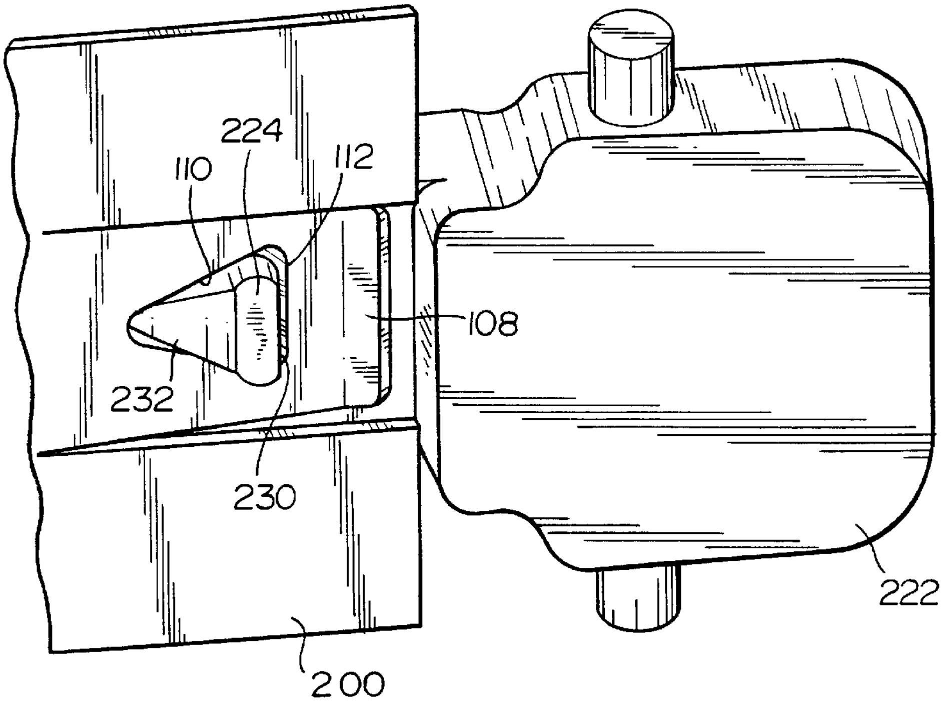
FIG. 3 is a bottom isometric view of the latch member of FIG. 2 engaged with the receiving member of the cage illustrated in FIG. 1.

FIG. 3 illustrates engagement of latch member 222 with receiving member 108 when the module (not shown) is plugged into mating port 100, in which lug 224 extends through opening 110. The engagement surface 112 and engagement portion 230 face each other to form an abutting engagement, which prevents the module (not shown) from being unplugged from mating port 100.

Figure 4:
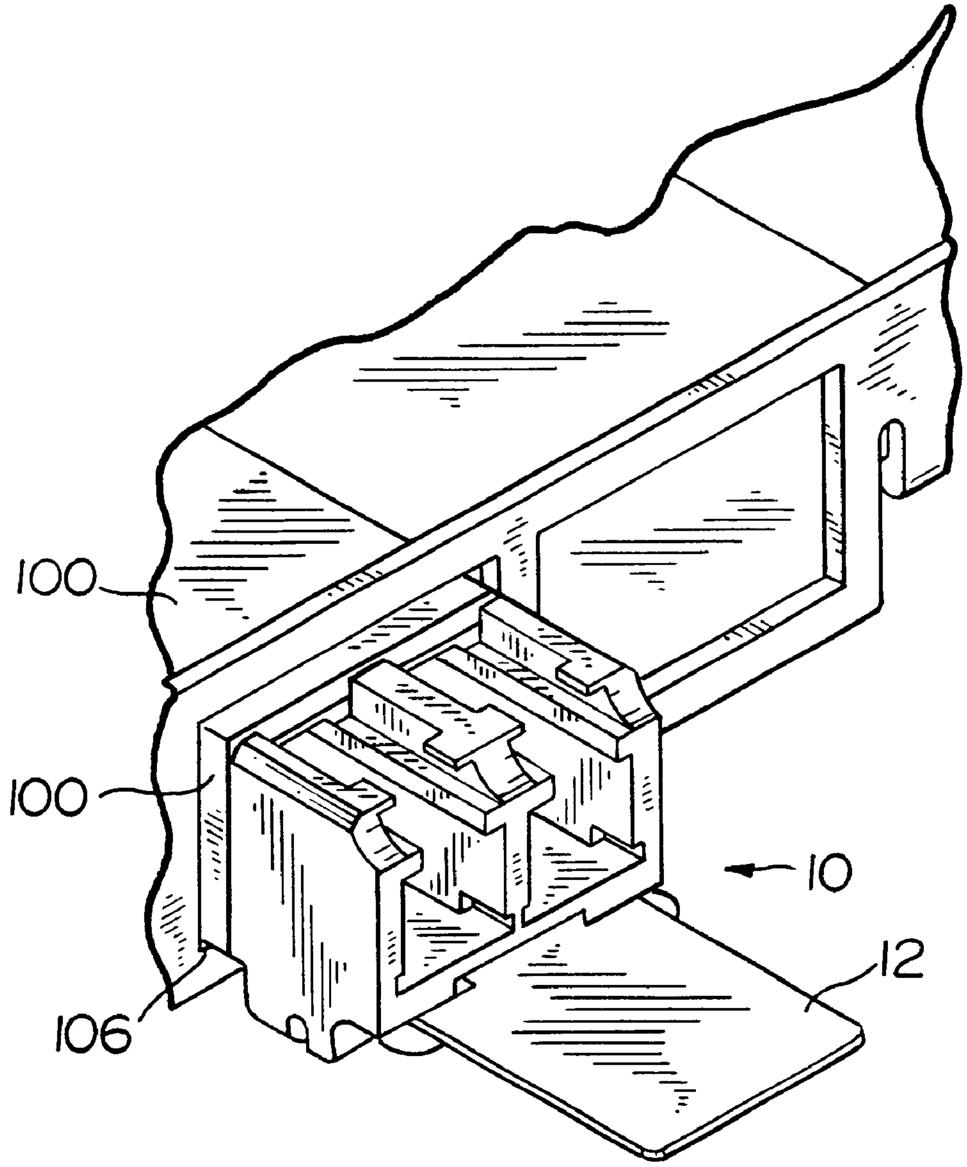
FIG. 4 is an elevated front isometric view of a pull tab and the exposed end of a transceiver module extending from the system housing bezel.

In FIG. 4, transceiver module 10 is shown projecting from mating port 100, and extending from the front end of the module is a pull tab latch control member 12. Pull tab latch control member 12 or latch member 222 may be made of a rigid plastic or other material or made of a flexible plastic or other material, such as a plastic coated fabric or other high strength fiber structure, for example.

Figure 5:
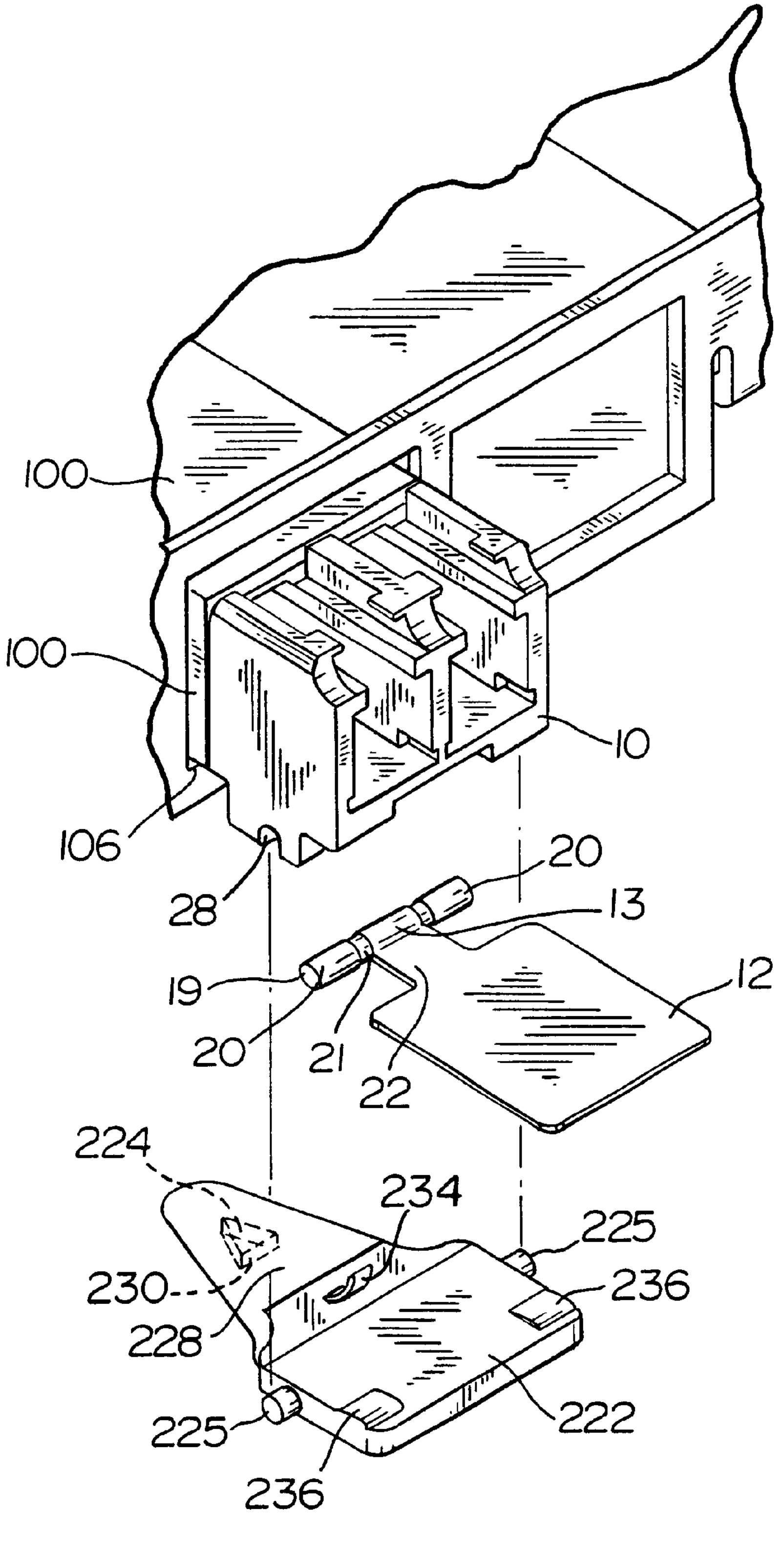
FIG. 5 is an exploded elevated front isometric view of the arrangement shown in FIG. 4.

In FIG. 5, the pull tab latch control member 12 and a latch member 222 are shown removed from the transceiver module 10. A latch control actuator 19 is formed as a shaft with enlarged cylindrical end portions 20 and a smaller diameter intermediate shaft 21 interconnecting them. The intermediate shaft 21 is sufficiently small so as to accommodate a loop 13 of the pull tab latch control member 12 to be wrapped around the intermediate shaft 21 and still have an outside dimension smaller than the diameter of the cylindrical end portions 20. The material segment 22 of the pull tab control member 12 is folded around the intermediate shaft 21. The ends of the material may be bonded together to form the tab portion 12 which may be flexible and easily gripped by an operator to transmit the pulling action on the tab portion 12 to the latch control actuator 19.

Latch member 222 is provided with a pair of shafts 225 which are snap fitted into the frames 28 of the transceiver module 10. This mounting arrangement permits the latch member 222 of the pull-to-release type to pivot with respect to the transceiver module 10, and permits the latch members, of the pull-to-release and plug-once types, to be interchangeable and easily replaceable if broken or damaged. Latch member 222, of the pull-to-release type, is provided with at least one and preferably a pair of ramps or wedges 236 on the upper surface of the latch member and on the opposite end of the latch member 222 from the latch arm 228. Latch member 222 is also provided with an optional biasing member 234 disposed thereon, which abuts the module 10 when the latch member is snap fitted into the module and biases the latch member downwardly towards the receiving member 108.

Reference is now to made to FIG. 6, which is a partial section side view of a module 10 adapted for a kit and having a latch member 222, of the pull-to-release type, engaged thereto. The left side structure of the transceiver module 10, as shown in FIG. 4, has been removed to expose the interior structure of the transceiver module 10, the latch member 222, the pull tab latch control member 12, and associated latch control actuator 19.

The latch control actuator 19 resides within a chamber 38 formed into the transceiver module 10 and by the input end of the latch member 222. In its operative aspects, the chamber 38 is defined by the ramp 232 on the latch member 222 and ramp 40, which is on the underside of the transceiver module 10 and converges with ramp 236 in the direction of left to right as illustrated in FIG. 6. The chamber 38 is formed to accept and contain the latch control actuator 19 with the latch arm 230 in a restored or latching position, i.e., with the input end elevated and the latch arm 230 depressed so that lug 224 extends through opening 110 of receiving member 108.

Movement of latch actuator 19 in a direction of left to right, as illustrated, and under the influence of the pull tab 12 being pulled outwardly from the transceiver module 10 will cause the cylindrical end portions 20 to engage ramps 236 and 40. Further movement of the latch actuator 19 causes the ramps 236, 40 to be spread apart one from the other and the latch member 222 to be pivoted about the shafts 225 of latch member 222 and frame 28, thereby raising the latch arm 230 and moving both latch lug 224 and latching surface 230 upward, out of interference with engaging surface 112 of receiving member 108.

Sloped portion 232 of the latch lug 224 is oriented to slide over the engaging surface 112 of receiving member 108, thereby eliminating the need for manually displacing latch lug 224 over the engaging surface on insertion of the transceiver module 10 and associated latch arm 30 into mating port 100. Likewise, slanted portion 109 of receiving member 108 is also oriented to slide under the sloped portion 232. One or both of the sloped portion 232 and slanted portion 109 may be used with the invention for engagement of latch lug 224 with receiving member 108.

FIG. 7 illustrates an embodiment of a module 10 for a kit without latch member 222, of the pull-to-release type, installed. The cylindrical end portions 20 of latch actuator 19 overlie the ramp 40 and are resident within chamber 38. Pulling the pull tab 12 will dislocate the latch actuator 19 up the ramp 40 and engage the latch member 222 on its ramps 232 as described earlier. In this view, biasing member 234 is shown as a pair and part of the transceiver module 10.

Figure 8:
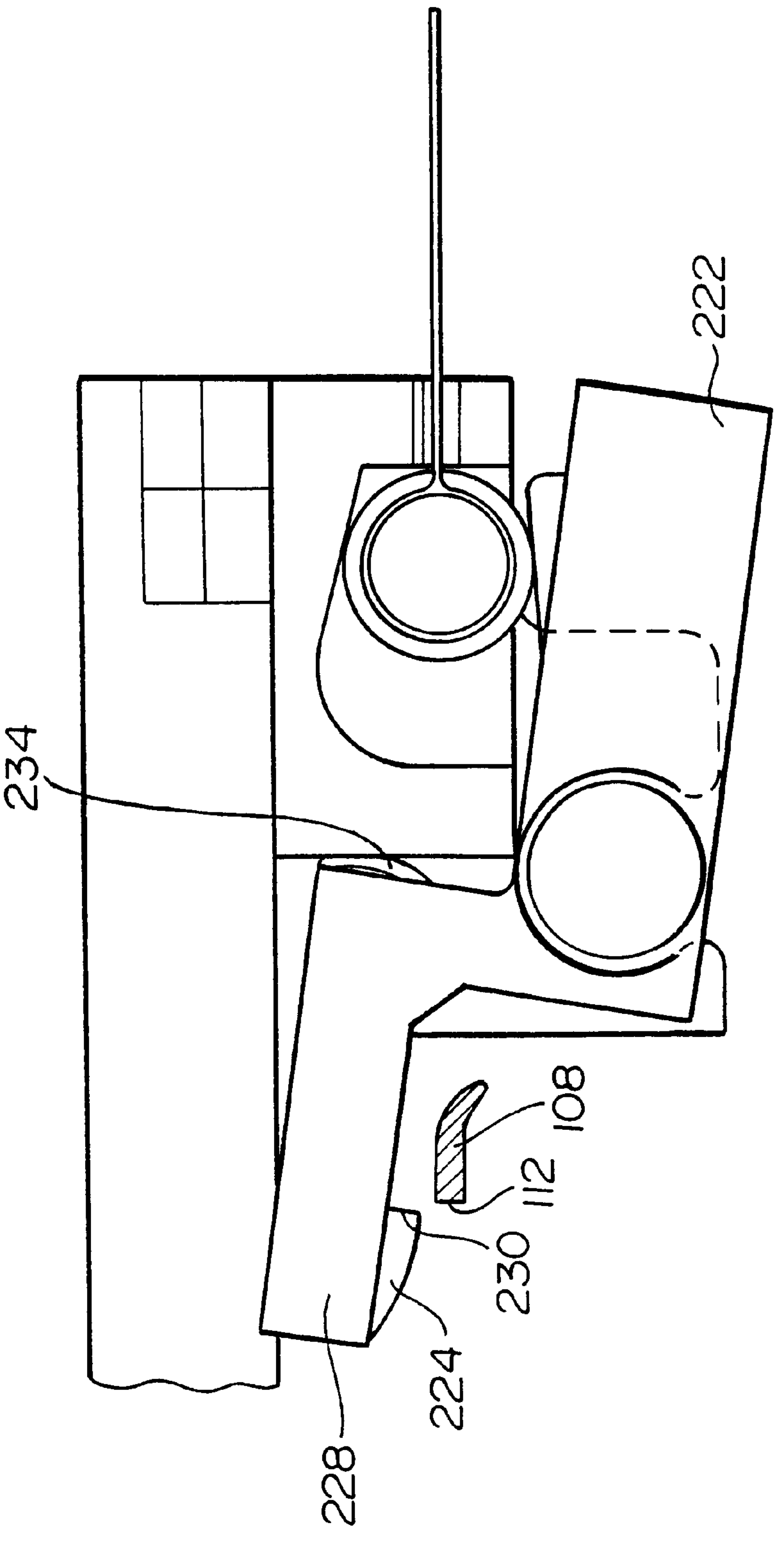
FIG. 8 is a partial side section view of a transceiver module, the pull mechanism and a pull-to-release latch member represented in an unlatched position resulting from pulling the pull tab.

The position of the various parts and members of a module are illustrated in the unlatched condition in FIG. 8, which is substantially the same as FIG. 6 with the exception of the displacement of the latch actuator 19 and the latch member 222 due to the displacement of the latch actuator 19 as a result of the pulling of the pull tab 12.

FIG. 9 shows an embodiment of latch member 222, of a plug-once type for use in a kit, where the upper surface of latch member 222 has formed thereon a raised portion, such as a latch abutment 240, that abuts a lower surface of module 10 when latch member 222 is engaged with module 10 via snap fitting of shafts 225 into frames 28. The abutment of latch abutment 240 with a lower surface of module 10 prevents lug 224 from moving upwards or away from receiving member 108, which precludes easy disengagement of latch member 222 from receiving member 108.

Figure 11:
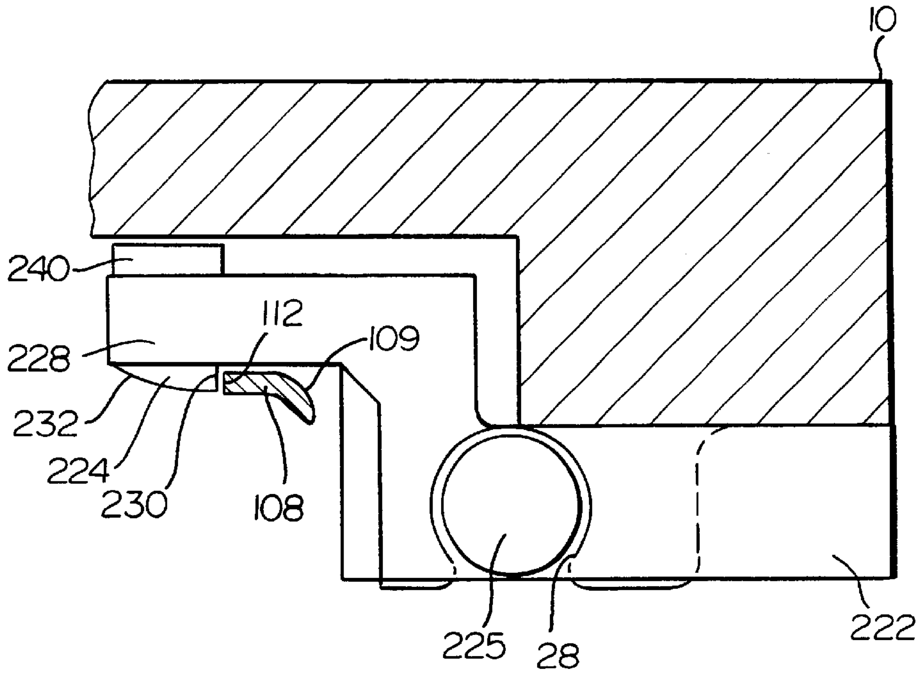
FIG. 11 is a partial side section view of a transceiver module and a plug-once latch member engaged therewith.
Figure 12:
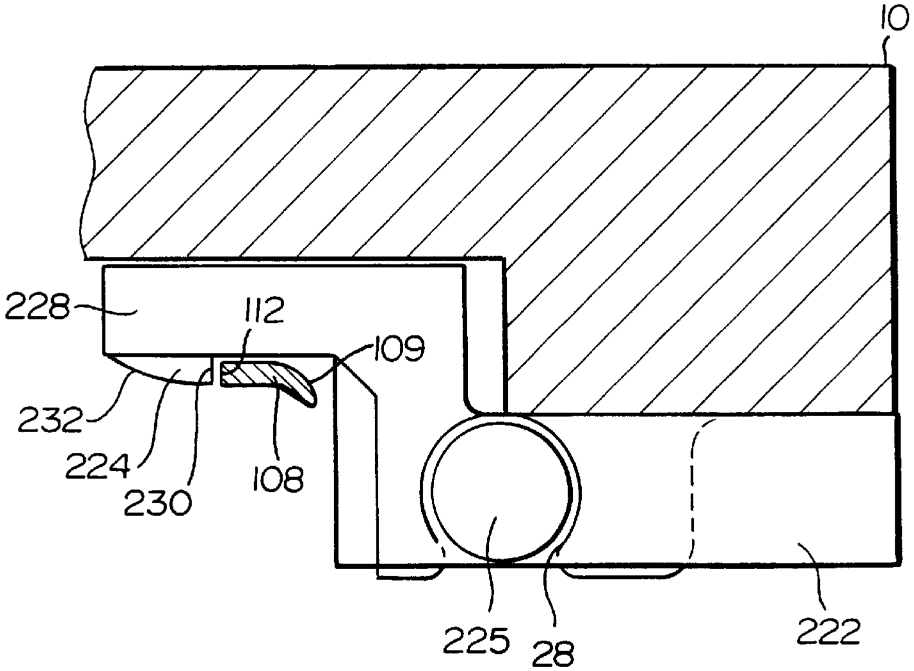
FIG. 12 is a partial side section view of another exemplary embodiment of a transceiver module and a plug-once latch member engaged therewith.

As illustrated in FIGS. 10–12, a latch member 222, of a plug-once type, engages a module 10 in substantially the same manner as shown in FIGS. 6 and 8, via snap fitting of shafts 225 into frames 28 of module 10. FIG. 10 shows a latch member 222, of a plug-once type for a kit, in which an upper surface of the latch member includes an latch abutment 240 that abuts a lower surface of module 10, which precludes easy disengagement of latch member 222 from receiving member 108.

FIG. 11 shows a latch member 222, of a plug-once type, engaged with an embodiment of a module 10 lacking a chamber 38, in which the upper surface of latch member 222 abuts a lower surface of module 10; while FIG. 12 shows an embodiment of latch member 222, of a plug-once type, where the upper surface of the latch member lacks a raised portion 240, and a lower surface of module 10 is lowered to abut the upper surface of latch member 222, both of which preclude easy disengagement of latch member 222 from receiving member 108.

With a pull-to-release latch, when module 10 is engaged with mating port 100, the receiving member 108 and latch arm 228 slide by each other, with either the receiving member 108 being flexed away from latch member 228 or latch member being pivoted away from the receiving member, or both.

With a plug-once latch, when module 10 is engaged with mating port 100, the receiving member 108 and latch arm 228 slide by each other, with the receiving member 108 being flexed away from latch member 228.

With either latch, when latch member 228 engages the mating port 100, latch lug 224 will slide over a portion of the receiving member 108 and then drop behind the engaging surface 112 that engages and retains latch member 222 into the inferring, latching position illustrated in FIG. 3 and thereby retain the transceiver module 10 within mating port 100.

The restore action necessary to reposition the latch member 222, of the pull-to-release type, for latching is accomplished by relieving the tension on the latch actuator 19 and the restoration of biasing member 234, which may be mounted on the latch member 24, as shown in FIG. 5. The deformation of the biasing member 234 during unlatching by the pivoting of the latch member 24 stores energy in the biasing member 234 and, as permitted to do so, expends that energy to pivot the latch member 24 counterclockwise to a latched position. The biasing member 234 may be disposed on the transceiver module 10 if so desired or may be placed in other positions on the latch arm 30 if space and design constraints dictate.

Figure 13:
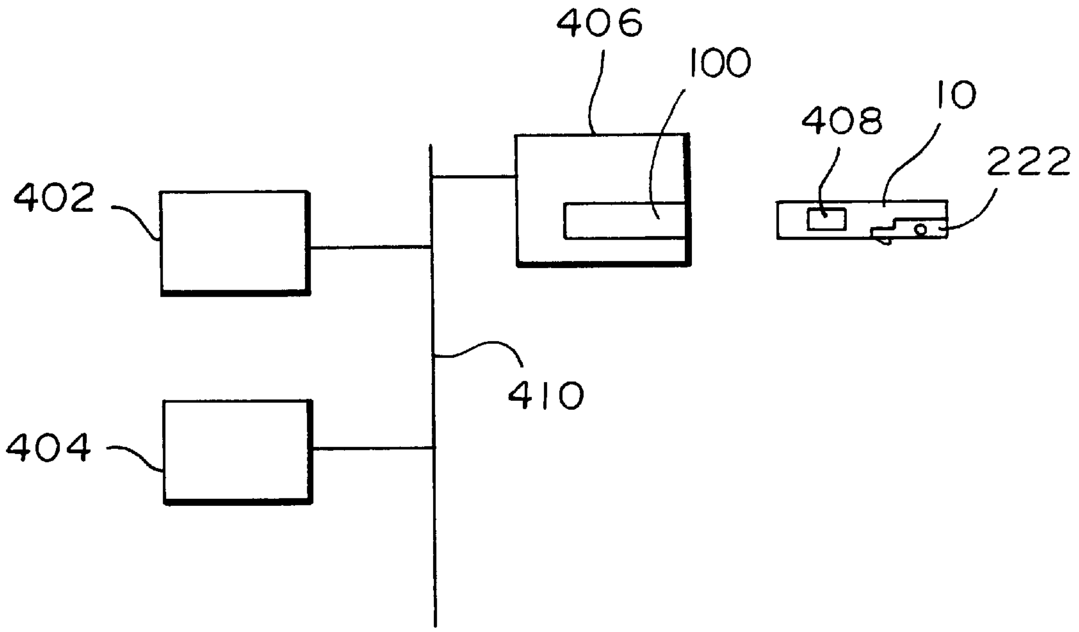
FIG. 13 illustrates an exemplary embodiment of a computer system having a CPU, a memory, and a network adapter having a mating port, a transceiver module with a latch member, and a transceiver subassembly disposed within the transceiver module.
Figure 14:
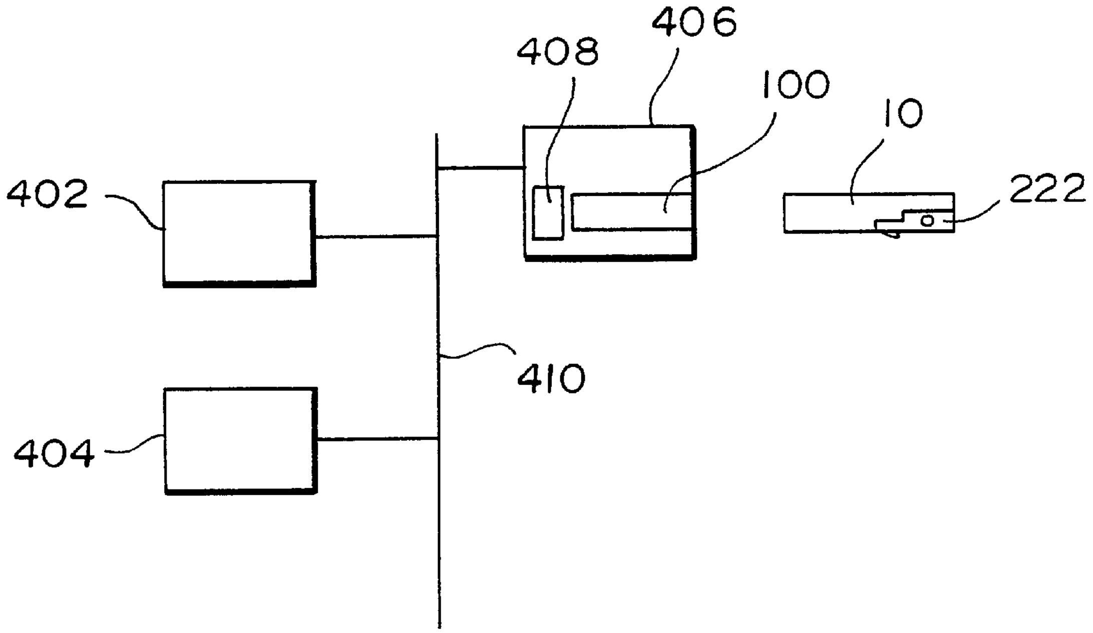
FIG. 14 illustrates another exemplary embodiment of a computer system, similar to that illustrated in FIG. 13, but with the transceiver subassembly disposed outside the transceiver module.

FIGS. 13 and 14 illustrate exemplary embodiments of a computer system having a CPU 402, a memory 404 and a network adapter 406, operatively connected to the CPU and the memory by at least one bus 408. The network adapter 406 has at least one transceiver subassembly 408 for receiving and transmitting computer readable signals over a network (not shown). The network adapter 406 also has a mating port 100 for receiving a transceiver module 10 having a latch member 222.

As illustrated, transceiver subassembly 408 may be disposed inside transceiver module 10 (shown in FIG. 13), or outside transceiver module 10 (shown in FIG. 14).

While the description of aspects of the invention and its latching action is made with reference to the engagement portion 230 engaging the engaging surface 112 of the receiving member 108, it should be understood that the engagement portion will perform its retention function equally well if it is engaged with a latch bar which is formed as a part of the bezel 104. The only requirements for the engaging portion 230 to perform its retention function is to engage an interfering structure when the transceiver module 10 is pulled or moved in an extracting direction with the latch member 222 remaining in its latching position. Examples of such structures may be found in the related United States Patent Applications listed above.

While the description of aspects of the invention has been made with reference to a transceiver module for purposes of the preferred embodiment, other non-electronic modules or devices may be latched by the use of this design of latch mechanism.

It should be understood, however, that the invention is not necessarily limited to the specific process, arrangement, materials and components shown and described above, but may be susceptible to numerous variations within the scope of the invention. For example, although the above-described exemplary aspects of the invention are believed to be particularly well suited for latching computer modules into mating ports, it is contemplated that the concepts of the present invention can be applied in other applications. For example, the concepts of the present application can be utilized whenever it is desired to provide a latching mechanism that is not too easily unlatchable; or a kit with interchangeable latch members, with one latch member being easily unlatchable and another that is not.

It will be apparent to one skilled in the art that the manner of making and using the claimed invention has been adequately disclosed in the above-written description of the preferred embodiments taken together with the drawings.

It will be understood that the above description of the embodiments of the present invention are susceptible to various modifications, changes and adaptations, and the same are intended to be comprehended within the meaning and range of equivalents of the appended claims.

What is claimed is:

1. A module, comprising:

a module body adapted to plug into a mating port; and a latch member attached to said module body, said latch member being immovable relative to said module body when attached thereto, said latch member being essentially always engaged with a receiving member of the mating port when said module body is plugged into the mating port to always hinder a removal of said module body from the mating port;

wherein said latch member has a lug on a lower surface thereof, said lug being adapted to engage the receiving member; and wherein the upper surface of said latch member includes a latch abutment that abuts said module body to prevent said lug from being moved relative to said module body.

2. The module of claim 1, wherein said latch member is removably attached to said module body.

3. The module of claim 1, wherein said lug has a sloped portion to facilitate the engagement of said lug with the receiving member.

4. A module, comprising:

a module body adapted to plug into a mating port; and a latch member attached to said module body, said latch member being immovable relative to said module body when attached thereto, said latch member being essentially always engaged with a receiving member of the mating port when said module body is plugged into the mating port to always hinder a removal of said module body from the mating port;

wherein said module body includes a frame, and said latch member further comprises a shaft, said shaft being engageable with said frame.

5. The module of claim 4, wherein said shaft is removably engagable with said frame to allow said latch member to be removed from said module body.

6. The module of claim 1, wherein said latch member is formed of a resilient material or a rigid material.

7. The module of claim 1, wherein said module body has a hollowed area to accommodate a transceiver subassembly therein.

8. A module, comprising:

a module body adapted to plug into a mating port having a receiving member; and a latch member kit, comprising at least:

a first latch member selectively and removably attachable to said module body, said first latch member being immovable relative to said module body when attached to said module body, said first latch member being essentially always engaged with the receiving member when said module body is plugged into the mating port to always hinder a removal of said module body from the mating port; and a second latch member selectively and removably attachable to said module body, said second latch member being movable to first and second positions relative to said module body when attached to said module body, said second latch member being only engaged with the receiving member when in the first position and when said module body is plugged into the mating port, to hinder a removal of said module body from the mating port, said second latch member being disengaged from the receiving member when in the second position and when said module body is plugged into the mating port, to allow the free removal of said module body from the mating port.

9. The module of claim 8, wherein when said second latch member is selectively attached to said module body, an upper surface of said second latch member faces said module body, and said second latch member is pivotable to the first and second positions relative to said module body.

10. The module of claim 8, wherein said first latch member comprises a first lug, disposed on a lower surface thereof, and being adapted to engage the receiving member, and wherein when said first latch member is selectively attached to said module body, an upper surface of said first latch member abuts said module body to prevent said first lug from being moved relative to said module body, and said second latch member comprises a second lug, disposed on a lower surface of said second latch member, and being adapted to engage the receiving member.

11. The module of claim 10, wherein an upper surface of said first latch member abuts a lower portion of said module body to prevent said first lug from being moved upwardly.

12. The module of claim 10, wherein said second latch member further comprises a ramp on an upper surface thereof, said ramp having a raised portion.

13. The module of claim 12, wherein said second latch member further comprises an actuator member having an actuator portion engageable with said ramp and said module body, and being movable between a third and a fourth position, wherein when said actuator member is the third position, said actuator portion engages the raised portion of said ramp and said body, to move said raised portion downwardly such that said second lug moves upwardly and out of engagement with said receiving member.

14. The module of claim 8, wherein said second latch member is resiliently biased to the first position.

15. The module of claim 8, further comprising a biasing member, disposed on one of said module body and said second latch member, and being adapted to bias said second latch member to the first position.

16. The module of claim 10, wherein said upper surface of said first latch member includes a latch abutment that abuts said module body to prevent said first lug from being moved relative to said module body.

17. The module of claim 10, where in said first lug has a sloped portion to facilitate an engagement of said first lug with said receiving member.

18. The module of claim 10, wherein said second lug has a sloped portion to facilitate an engagement of said second lug with said receiving member.

19. The module of claim 8, wherein said module body includes a frame, and each of said first latch member and said second latch member further comprise a shaft, the respective shafts being engageable with said frame.

20. The module of claim 19, wherein said respective shafts are removably engagable with said frame to allow said first latch member and said second latch member to be selectively removed from said module body.

21. The module of claim 8, wherein said first latch member and said second latch member are formed of a resilient material.

22. The module of claim 8, wherein said first latch member and said second latch member are formed of a rigid material.

23. The module of claim 8, wherein said module body has a hollowed area to accommodate a transceiver subassembly therein.

24. A computer system, comprising:

a CPU;

a memory; and a network adapter, operatively connected to said CPU and said memory by at least one bus, said network adapter comprising:

at least one transceiver subassembly for receiving and transmitting computer readable signals;

a mating port; and a module, said module comprising:

a module body adapted to plug into a mating port; and a latch member attached to said module body, said latch member being immovable relative to said module body when attached thereto, said latch member being essentially always engaged with a receiving member of said mating port when said module body is plugged into said mating port to always hinder a removal of said module body from said mating port;

wherein said latch member has a lug on a lower surface thereof, said lug being adapted to engage the receiving member;

wherein said upper surface of said latch member includes a latch abutment that abuts said module body to prevent said lug from being moved relative to said module body.

25. The computer system of claim 24, wherein said latch member is removably attached to said module body.

* * * * *